Figure 1:
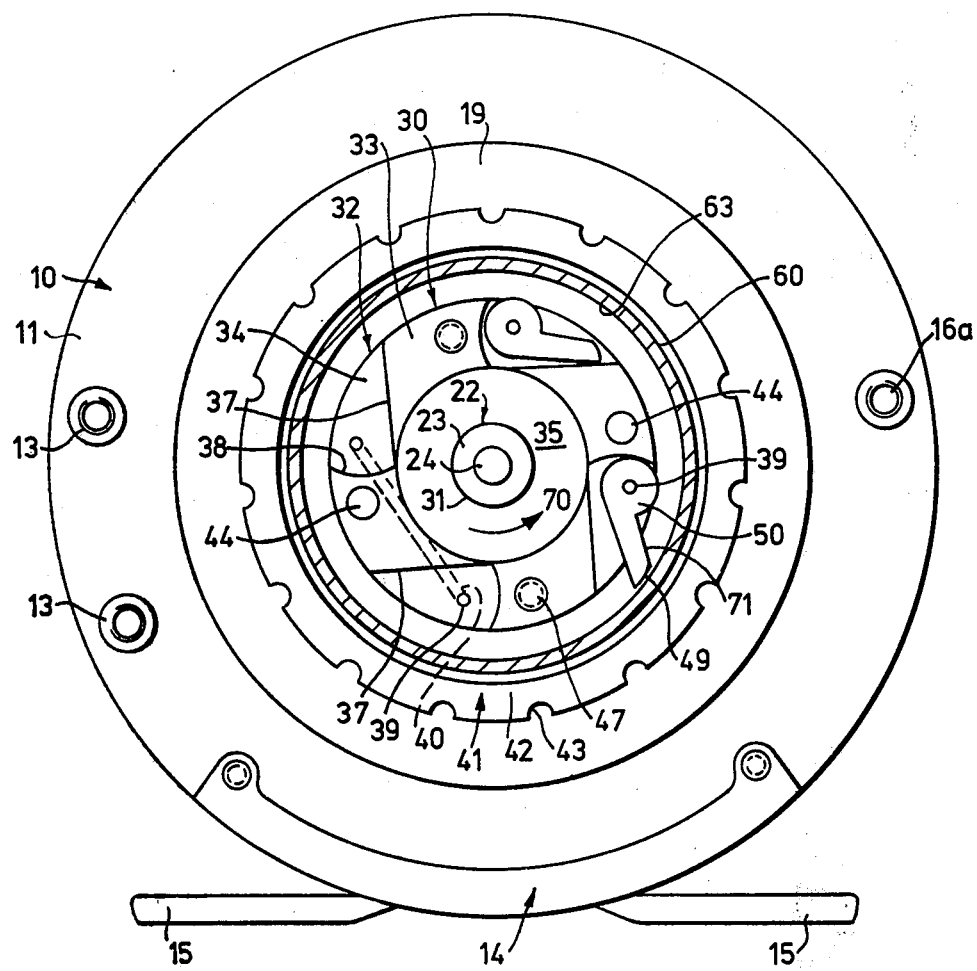

United States Patent [19]
Cooper

[11] 3,944,160
[45] Mar. 16, 1976

[54] CASTING REEL SPOOL SPEED CONTROL DEVICE
[76] Inventor: Douglas Cooper, 14 Fairmile Road, Sherwood Estate, Tunbridge Wells, England
[22] Filed: June 3, 1974
[21] Appl. No.: 476,098

[30] Foreign Application Priority Data
June 7, 1973 United Kingdom............... 27146/73

[52] U.S. Cl............. 242/84.52 C; 188/186; 188/238
[51] Int. Cl.².......................................... A01K 89/02
[58] Field of Search...... 242/84.52 C; 188/186, 238, 188/234

[56] References Cited
UNITED STATES PATENTS
3,171,609  3/1965  Baenziger.................... 242/84.52 C
3,477,659  11/1969  Morritt......................... 242/84.52 C FOREIGN PATENTS OR APPLICATIONS
149,688  4/1955  Sweden.......................... 242/84.52 C Primary Examiner—Billy S. Taylor

[57] ABSTRACT

A casting reel spool speed control device comprises a disc member for rotation with a reel spool within, spaced from and relative to a cylindrical housing secured to a reel cage. Two or more pawl-shaped speed control fingers are freely, pivotally mounted in slots opening onto the rim of the disc member to move under the combined counter-balancing influence of centrifugal force and air resistance between retracted positions in the slots and deployed positions in which the bevelled finger tips lightly brush or just clear the inner circular surface of the cylindrical housing. The speed control or braking action is very light and is just sufficient to cure the problem of reel overrun during casting upwind.

5 Claims, 2 Drawing Figures

CASTING REEL SPOOL SPEED CONTROL DEVICE

This invention relates to casting reels for fishing tackle and has particular application to multiplier casting reels, beach casting reels and similar reels for use in situations where long casting is desired.

If a cast is made into the wind, the weight at the end of the line decelerates relative to the ground during its few seconds flight through the air. At the same time the reel continues to rotate and pay out the line at substantially the full speed imparted to it at the start of the cast. Consequently the reel overruns, the line slackens, tangles up tightly in the reel cage and jams. It can take very considerable effort and time to untangle the line again. A similar result can occur when a cast is made with a jerky action rather than the desired smooth powerful action: in this case the reel may be imparted an undesirably high initial speed and again overrun the weight.

This problem of overrun has been met to some extent by the use the anglers thumb dabbing lightly on the unwinding reel: this is not only very difficult but can be painful to the thumb.

According to the present invention there is provided a casting reel speed control device comprising a member adapted for rotation with a reel within, spaced from, and relative to a cylindrical housing adapted to be secured to a reel cage, and a plurality of speed control fingers pivotally mounted to the rotatable member for movement under the influence of centrifugal force between retracted positions and deployed positions in which their tips lightly brush or are just clear of an inner substantially circular surface of said housing.

The shape, disposition and mass of the fingers is such that even at the highest normally expected rate of reel rotation their effect on the rate of reel rotation is relatively small: in other words gives just sufficient smooth braking or regulation to cure the discussed problem of reel overrun.

The fingers are preferably shaped and disposed so that the force due to air resistance acting on the fingers in their deployed position is significant in tending to move the fingers back towards their retracted positions. This air resistance force increases with reel speed and thus reduces the rate of increase in braking force with increased speed which would be due to the centrifugal force acting alone. The device is preferably fairly closely enclosed when installed in a complete reel to assist air resistance becoming a significant force in operation as just described.

The tips of the fingers are preferably bevelled so that in their deployed positions the bevels are generally parallel to the braking surface.

The fingers are preferably in the general shape of pawls or commas, the indents facing forwardly with respect to the direction of rotation during casting, not rearwardly as might be expected.

Figure 2:
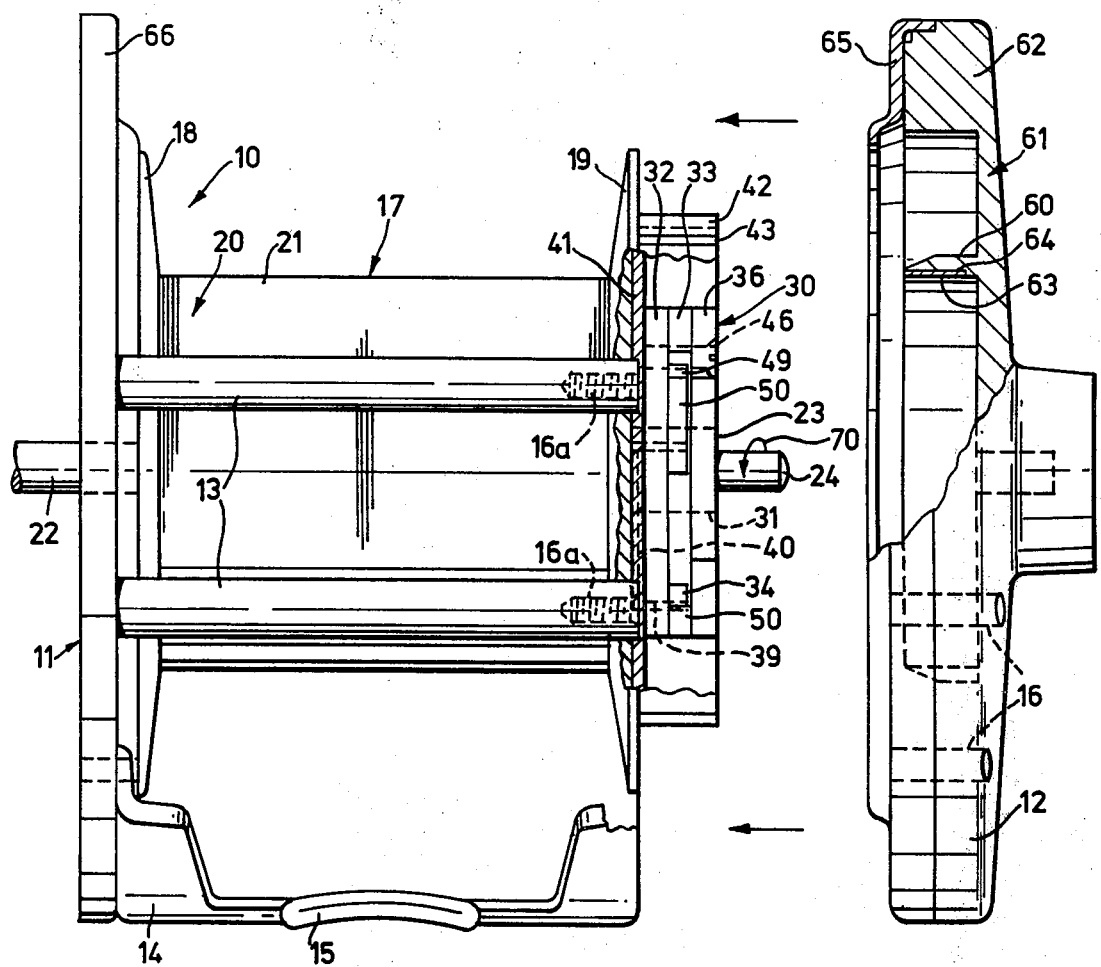

An embodiment of the invention will now be described, by way of example, with reference to the accompanying drawings, in which:

FIG. 1 is an end view of a casting reel with parts removed to show a speed control device according to the present invention; and FIG. 2 is a side view of the reel with one reel cage side-plate shown detached and with portions broken away.

Referring to the drawings, there is shown a casting reel comprising a reel cage 10, including reel sideplates 11 and 12. Plates 11 and 12 are spaced and secured together by the conventional four cage bars 13 and by an attachment shoe assembly 14 having tongues 15 for attaching the reel to a rod butt. The plate 12 is shown removed in FIG. 2. It is secured in position by screws working through bores 16 into threaded recesses 16a in the cage bars 13 and shoe assembly 14.

A reel spool 17 is mounted for rotation within the reel cage. The spool has end flanges 18, 19, a body 20 upon which in use fishing line 21 is wound, a shaft 22. The left-hand end of shaft 22 in FIG. 2 is received in a suitable bearing, clutch and gear drive assembly and driven by a manually operable handle (none of which is shown) as conventional in the art. The right-hand end of shaft 22 is received in a suitable conventional bearing (not shown) in the reel side-plate 12.

The right-hand end of shaft 22 presents a shoulder 23 and an end portion 24 of reduced diameter. A speed control device according to the present invention includes a composite disc member 30 adapted for rotation with the reel spool 17 within, spaced from and relative to a cylindrical housing 60 forming part of the reel side-plate 12 as will be described below. The disc member 30 is suitably formed of "Nylon" and is a tight press fit or is otherwise keyed to the shaft 22 of the reel spool 17 for rotation therewith. A central aperture 31 is shown for this purpose.

The composite disc member comprises a first ring member 32, an intermediate ring member 33 having four symmetrically disposed shaped cutouts 34 therein and a central boss 35; and a top ring member 36 (removed for clarity in FIG. 1) which is of the same outside diameter as members 32 and 33 and fits around the boss 35 so that the cutouts 34 become effectively narrow slots opening onto the rim of the assembled composite disc member.

The four cutouts 34 each have a straight side 37 substantially tangential to the boss 35, and a curved forward face 38. The cutouts are provided with pivot pins 39 standing out therefrom, which in a preferred embodiment are formed by two wire staples 40 inserted from the rear of the ring member 32 each through two apertures in the ring member. Adhesive tape (not shown) may be used to retain the staples in position. The staples are suitably of stainless steel wire.

Ring member 32 (and suitably also ring 33) is preferably formed integrally with a further disc member 41 which abuts the outer end face of the reel flange 19. Member 41 has an outstanding peripheral flange 42 provided with dimples 43 on its outer peripheral surface. A springy drag finger (not shown) mounted to the end plate 12, is selectively cooperable with these dimples to provide drag on the line when the line is paid out as familiar to those in the art.

Ring member 33 is actually shown as being rivetted to the integral members 32 and 41 by means of rivets 44. It will be seen from FIG. 2 that the bridge portion of each staple 40 is received in a groove formed in the rear face of the member 41. The top ring 36 is screwed to the other ring members by screws 46 working in threaded apertures 47.

Pawl-shaped fingers 50 are freely pivotally mounted by the pivot pins 39. The lower left-hand two being removed for clarity in FIG. 1. The fingers 50 are freely pivotally movable between retracted positions as shown for the pawl at the top of FIG. 1, and deployed positions as shown by the pawl at the right-hand side of FIG. 1. The tips 49 of the fingers 50 are smoothly bevelled and very slightly curved so that the tips 49 lie substantially parallel to the surface of housing 60 when the fingers are deployed so that a small surface portion of the finger tips 49 lightly brush the housing. The fingers are preferably formed of a hard tough polymeric or reinforced polymeric material such as the reinforced phenol formaldehyde resin sold under the Registered Trade Mark "Tufnol" Alternatively they may be of a metal such as phosphor bronze. They are of a material different from the material used for housing 60.

The reel side plate 12 comprises a disc body portion 61 having a thickened rim portion 62 and an intermediate circular flange constituting the cylindrical housing 60 referred to above. The inner circular surface 63 of housing 60 is the surface with which the tips of the fingers 50 co-act. This surface 63 is preferably provided with a metallic insert 64, e.g. of brass, bronze or stainless steel. A chromed trim ring 65 is provided on the body portion 61 and faces a similar trim ring 66 on the opposite side plate 11. It will be seen that when the side plate 12 is screwed in position the peripheral edge of housing 60 substantially abuts the face of the disc member 41. A substantially completely enclosed chamber thereby results, defined between the circular inner surface of housing 60, the substantially circular outer surface of the composite disc member, and having its annular ends closed by wall portions of the disc member 41 and of the body portion 61 of the side plate 12 respectively.

The direction of rotation shown by arrow 70 in each figure is the direction of rotation of the reel when casting. During casting the reel rotates very rapidly and the finger tip portions 49 fly outwardly under centrifugal action so that they lightly brush or just clear the surface 63. Air resistance acting on the inclined forward faces 71 of the deployed fingers together with the pawl shape of the fingers is found in practice to keep the braking action very light, which is exactly what is required to give a practical and effective solution to the described problem of reel overrun.

The braking action is light, regardless of reel speed over a wide range, and in particular does not increase rapidly at high reel speeds. It is considered that the fairly close enclosure of the annular braking chamber assists the air resistance effect. Thus three walls of this chamber are stationary and exert frictional drag on the air in the chamber tending to prevent the air moving with the fingers. The air is thus forced to flow to both sides of each pawl in turn, which each occupy about one third of the width of the annular chamber as seen in FIG. 2. The air flow will also tend to cam up the inclined forward surfaces 71 of the fingers and attempt to funnel through between the finger tip and the housing surface thereby keeping the actual rubbing or brushing down to a minimum.

Purely as an example one embodiment of the invention was found to reduce the total number of revolutions of a reel during a long cast (e.g. 150 yards) by about 30 or 40 revolutions. Since approximately 6 inches of line pays out for each spool revolution (clearly the amount decreases as the spool depletes), then about one thousand reel revolutions are required to cast this distance. The reductions is therefore only about 3 to 4%. It will also be appreciated that to accomplish one thousand revolutions in the 6 to 8 seconds the cast takes, requires a reel speed of up to 10,000 r.p.m. or even more. The significant achievement of this invention is to give the required very gentle speed control effect under such ardous and variable conditions. Moreover the desired control is achieved by means which is mechanically very simple and trouble-free, and in particular involves no parts under permanent force when not in use, such as springs for example, which can easily jam in incorrect positions.

It will be appreciated that any number of fingers may be used, from two upwards, provided they are reasonably symmetrically distributed. The pawls may also be removable, individually or in groups, to alter the extent of the braking action, and may also be interchangeable with heavier or lighter firngers for different casting and wind conditions. The pawls would be removed altogether for maximum casting distance, and the heavier fingers would be used for casting directly upwind.

Reels according to the invention may be referred to as using the "Cooper Duo-Centrifugal Governor".

What I claim as new and desired to secure by Letters Patent of the United States is:

1. In a casting reel comprising a reel cage, a reel spool, and a bearing means rotatably mounting said spool within said cage, the improvement comprising a reel spool speed control device, said device including a cylindrical housing adapted to be secured to said reel cage and presenting a substantially circular inner surface, a rotatable disc member adapted to rotate with said reel spool and having a generally circular outer circumferential surface disposed radially inwardly of and spaced from said substantially circular inner surface of said cylindrical housing to define between said surfaces an annular braking chamber, wall means extending substantially completely across the annular axial ends of said braking chamber to substantially completely enclose said braking chamber, a plurality of speed control fingers, and pivot means individually freely pivotally mounting said fingers to said rotatable member, each said speed control finger being formed of light-weight wear-resistant material and being generally pawl-shaped having a boss portion around said pivot means and a pawl arm portion extending from said boss portion to present a smooth side surface and an opposite indented side surface and a tip surface, each said pawl-shaped finger being mounted on its pivot means with said indented side surface leading and said smooth side surface trailing with respect to the direction of rotation of the disc member during a casting action, whereby said speed control fingers are freely pivotable for movement under the combined influence of mutually opposedly acting centrifugal force and air-resistance force between retracted positions and deployed positions in which said tip surfaces lightly brush or are just clear of said substantially circular inner surface of said cylindrical housing, whereby to control a casting action.

2. A casting reel spool speed control device as claimed in claim 1 wherein said disc member is provided with slots formed within the disc member and opening onto said outer circumferential surface, said pivot means extending across said respective slots so that said boss portions of said fingers are received in their respective slots, and so that said pawl arm portions extend from the slots into said annular braking chamber in their deployed positions.

3. A casting reel spool speed control device according to claim 1 wherein said tips of said fingers are bevelled so that in their deployed position the bevelled tips are substantially parallel to the substantially circular inner surface of said cylindrical housing.

4. A casting reel spool speed control device according to claim 2 wherein said fingers in their fully retracted positions are substantially completely received within their respective slots.

5. A casting reel spool speed control device according to claim 1 wherein the two or two of the fingers are pivotally mounted by means of pivot means in the form of a single wire staple, said staple having substantially parallel end lengths which serve as two pivot pins.

* * * * *